(12) United States Patent
Fickert-Guenther et al.

(10) Patent No.: US 11,092,240 B2
(45) Date of Patent: Aug. 17, 2021

(54) SEALING ELEMENT AND BEARING ARRANGEMENT THEREWITH

(71) Applicant: Schaeffler Technologies AG & Co. KG, Herzogenaurach (DE)

(72) Inventors: Thomas Fickert-Guenther, Hirschaid (DE); Yuan Yao, Hagenbüchach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/491,021

(22) PCT Filed: Feb. 22, 2018

(86) PCT No.: PCT/DE2018/100157
§ 371 (c)(1),
(2) Date: Sep. 4, 2019

(87) PCT Pub. No.: WO2018/177455
PCT Pub. Date: Oct. 4, 2018

(65) Prior Publication Data
US 2020/0011424 A1 Jan. 9, 2020

(30) Foreign Application Priority Data
Mar. 30, 2017 (DE) .......... 10 2017 106 885

(51) Int. Cl.
| | |
|---|---|
| *F16J 15/32* | (2016.01) |
| *F16C 33/78* | (2006.01) |
| *F16J 15/44* | (2006.01) |
| *F16C 43/04* | (2006.01) |
| *F16J 15/3268* | (2016.01) |
| *F16J 15/447* | (2006.01) |

(52) U.S. Cl.
CPC .......... *F16J 15/3268* (2013.01); *F16C 33/783* (2013.01); *F16C 33/7846* (2013.01); *F16C 43/045* (2013.01); *F16J 15/4472* (2013.01)

(58) Field of Classification Search
CPC .... F16C 19/04; F16C 33/783; F16C 33/7846; F16C 33/7853; F16C 43/045; F16J 15/3268; F16J 15/4747
USPC ........ 384/477, 482, 486, 138; 277/403, 562, 277/574, 397–398, 572
See application file for complete search history.

(56) References Cited

U.S. PATENT DOCUMENTS

| | | | |
|---|---|---|---|
| 3,709,572 A | * | 1/1973 | Pethis ................... F16C 33/726 277/376 |
| 4,525,082 A | | 6/1985 | Brandenstein et al. |

(Continued)

FOREIGN PATENT DOCUMENTS

| | | |
|---|---|---|
| CN | 102619990 A | 8/2012 |
| CN | 105114469 A | 12/2015 |

(Continued)

*Primary Examiner* — Marcus Charles
(74) *Attorney, Agent, or Firm* — Reid Baldwin

(57) ABSTRACT

A sealing element seals a space between a first bearing ring and a second bearing ring. The sealing ring includes a sealing disk which has a plurality of sealing segments on at least one periphery. Alternate sealing segments are oriented at positive and negative angles with respect to a main plane of the sealing disk. The sealing element is installed into the bearing such that the sealing segments extend into and contact a recess in one of the bearing rings.

11 Claims, 2 Drawing Sheets

(56) References Cited

U.S. PATENT DOCUMENTS

| | | | |
|---|---|---|---|
| 4,588,312 A * | 5/1986 | Dickinson | F16C 33/7853 384/482 |
| 5,577,845 A | 11/1996 | Ishida et al. | |
| 5,649,772 A * | 7/1997 | Schlereth | F16C 33/785 277/562 |
| 6,179,472 B1 * | 1/2001 | Gilliland | F16C 33/80 384/477 |
| 6,402,158 B1 | 6/2002 | Imazaike | |
| 6,715,922 B2 * | 4/2004 | Asai | F16C 33/7853 384/482 |
| 7,011,452 B2 * | 3/2006 | Suzuki | F16C 33/783 277/411 |
| 8,690,444 B2 * | 4/2014 | Bjorkman | F02F 7/0053 277/572 |
| 9,234,546 B2 * | 1/2016 | Engstrom | F16C 33/7856 |

FOREIGN PATENT DOCUMENTS

| | | | | |
|---|---|---|---|---|
| DE | 102012224020 A1 | | 6/2014 | |
| DE | 102014223217 A1 * | | 5/2016 | F16J 15/54 |
| FR | 3001506 A1 | | 1/2013 | |
| IE | 3402366 A1 | | 8/1985 | |
| JP | S5963222 U | | 4/1984 | |
| JP | 2003287041 A | | 10/2003 | |

\* cited by examiner

SEALING ELEMENT AND BEARING ARRANGEMENT THEREWITH

CROSS-REFERENCE TO RELATED APPLICATIONS

This application is the U.S. National Phase of PCT Appln. No. PCT/DE2018/100157 filed Feb. 22, 2018, which claims priority to DE 10 2017 106 885.6 filed Mar. 30, 2017, the entire disclosures of which are incorporated by reference herein.

TECHNICAL FIELD

A sealing element seals a space between a first bearing ring and a second bearing ring which have a common axis of rotation. The sealing element comprises a sealing disk which has a plurality of sealing segments on at least one circumference. A bearing arrangement has a sealing element of this kind.

BACKGROUND

A seal is inserted between at least two machine elements, in order to limit or prevent unwanted substance transfers from one space into another space. Both static and dynamic sealing systems for sealing two components are known in the art. In many cases, static profile seals are made of an elastomer and are used for sealing housing covers or as a flange seal, for example. I-profile seals or O-rings are frequently used for static sealing. The profile seals are intended to guarantee tightness between the components during different operating states, wherein existing dimensional and positional tolerances have to be balanced. Grooves or depressions are routinely introduced into components or holding burls are provided on the profile seals, in order to achieve a tight fit of the profile seals. During assembly, dimensionally unstable elastomer seals are pressed between the components in order to achieve the desired sealing effect.

A bearing is described in DE 10 2012 224 020 A1 which comprises a bearing ring with a lateral surface formed by at least one undercut. Furthermore, the bearing ring comprises at least one sealing element with an elastomer portion and an elastic holding lip. The lateral surface has a contour with a bearing region for the axial securing of the holding lip. This structure is sensitive to tolerance fluctuations, which causes the bearing ring to form an oval. In order to guarantee the sealing function of the sealing element in a bearing ring, the uncoupling of the corresponding shape and dimensional tolerances is desirable.

SUMMARY

A sealing element is used to seal a space between a first bearing ring and a second bearing ring. The bearing rings have a common axis of rotation about which they are rotatable in respect of one another. The sealing element comprises a sealing disk which has a plurality of sealing segments on its inner and/or outer circumference. The sealing disk has a main extension plane which is preferably radially oriented. The sealing segments are oriented at an angle to the main extension plane of the sealing disk. The sealing segments are divided into at least two sealing segment groups. The first sealing segment group exhibits a negative angle and the second sealing segment group exhibits a positive angle in relation to the main extension plane.

The sealing segments are arranged alternately on the sealing disk, so that a sealing segment of the first sealing segment group is arranged between a sealing segment of the second sealing segment group on the sealing disk in each case and sealing segments of the first sealing segment group follow the sealing segments of the second sealing segment, and so on.

Alternative terms for sealing segments which will be known to the person skilled in the art are fingers, catches or lugs.

The sealing segments preferably rest with their side surfaces at least partially against one another. The sealing disk is preferably configured as a disk.

The sealing element may have two sealing segment groups. Alternatively, the sealing element may have three or more sealing segment groups. The sealing segments of the first sealing segment group may be shorter than the sealing segments of the second sealing segment group. The sealing disk and the sealing segments are preferably configured together in one piece.

The positive and negative angles which span the sealing segments and the main extension plane of the sealing element are preferably smaller than 90°. The positive and negative angles which span the sealing segments and the main extension plane are preferably smaller than 45°. Particularly preferably, an angle between the sealing segments of a sealing segment group and the main extension plane falls within the range of 25° to 1°, and an angle between the sealing segments of the other sealing segment group and the main extension plane falls within the range of +45° to +1°. The negative and positive angles may differ in magnitude.

In one embodiment, the individual sealing segments of each sealing segment group exhibit different span angles to the main extension plane. The span angles between the sealing segments of a sealing segment group and the main extension plane may be equal. The main extension plane preferably runs along the center of the sealing disk.

The sealing segments are preferably cuboid, so that if the sealing segments of all sealing segment groups were to be arranged in one plane, they would form a closed ring. The sealing segments may also exhibit different shapes.

The thickness of the sealing segments preferably corresponds to the thickness of the sealing disk. The sealing segments may be tapered on their outer circumference. The sealing segments preferably each have a sealing edge on their outer circumference. By means of the sealing edge, the sealing element can be placed on a bearing ring or another machine element for sealing.

The sealing segments may be arranged on the radially outer circumference of the sealing disk. Alternatively, the sealing segments may be arranged on the radially inner circumference of the sealing disk. In an alternative embodiment, sealing segments are formed both on the inner and on the outer sealing disk circumference.

Multiple sealing segments are preferably arranged on the sealing disk. At least five sealing segments per sealing segment group are preferably arranged on the sealing disk. Particularly preferably, at least ten sealing segments per sealing segment group are arranged on the sealing disk.

The sealing element is preferably made of a polymer or elastomer. Alternatively, the sealing element may be made of a metal. Alternatively, the sealing element may be made of a combination of metals and polymers, wherein the sealing element has a metal reinforcement, for example.

In one embodiment, the sealing element has a further sealing segment which is used to improve the sealing of the space in respect of substances. The further sealing segment is preferably arranged on the sealing disk at an angle beneath the two sealing segments. The further sealing segment preferably has a circumferential configuration on the sealing disk. The further sealing segment and the main extension plane preferably span an angle smaller than 90°. Particularly preferably, the span angle between the further sealing segment and the main extension plane lies between 90° and 75°.

The bearing arrangement comprises a first bearing ring and a second bearing ring which can be rotated about a common axis, the axis of rotation. Multiple rolling bodies are arranged between the bearing rings. Furthermore, the bearing arrangement comprises a sealing element which is identical to the previously described sealing element. The features and embodiments listed in relation to the sealing element apply. At least one of the two bearing rings has at least one recess which is configured circumferentially on the surface facing the other bearing ring. The sealing element, in particular the sealing segments, comes to rest in the recess.

The sealing element may be a static seal. The sealing element preferably rests against the bearing ring with the side of the sealing disk remote from the sealing segments in a non-rotatable manner, the bearing ring displaying no recess.

The sealing segments of the first and second sealing segment group preferably lie with their sealing edges in the recess of the bearing ring. The recess forms a defined bearing region. The recess is preferably round. Alternatively, the recess may be square. The recess may, however, also exhibit any other conceivable shape.

The at least one bearing ring on which the recess is formed preferably has a recess edge. The recess edge preferably lies parallel to the axis of rotation of the bearing ring. Particularly preferably, the recess edge is configured towards the bearing ring. The recess edge has a predetermined diameter, the caliber.

The sealing segments of the second sealing segment group preferably extend radially beyond the recess edge into the recess. The diameter of the sealing segments of the second sealing segment group is therefore preferably greater than the diameter of the recess edge.

The sealing segments of the first sealing segment group preferably do not extend beyond the recess edge into the recess. They are therefore shorter in design than the sealing segments of the second sealing segment group.

The sealing segments of the first sealing segment group are preferably angled axially in the direction of the rolling bodies, preferably in the assembly direction, and rest in the recess.

The sealing segment of a further sealing segment group preferably lies outside the recess on the bearing ring. The further sealing segment is preferably internal, in other words oriented axially in the direction of the rolling body on the sealing disk.

The main extension plane of the sealing disk preferably lies orthogonally to the axis of rotation of the bearing rings.

One advantage of the sealing element and also the bearing arrangement with the sealing element can be seen as the fixing. The sealing element is positioned and fixed more accurately by the embodiment of the sealing segments. In particular, the axial positioning accuracy is increased. The fit in the installed state can be reproduced. Moreover, the system is less sensitive to tolerance fluctuations in and on the bearing.

The configuration of the sealing head, in particular the arrangement of the sealing segments on the sealing disk, allows a selective introduction of force. Consequently, the fanned-out sealing head acts against ovalization. A further advantage is that the assembly or installation of the sealing element in the bearing is simplified. A simple stamp is used to assemble the sealing element, for example. By means of the stamp, the sealing element is pressed along the edge of the recess into the recess in the bearing, wherein the sealing segments of the first sealing segment group do not come into contact with the recess edge, and wherein the sealing segments of the second sealing segment group rest against the recess edge temporarily and are temporarily elastically deformed during this.

During the further pressing action, the sealing segments of the first sealing segment group may be elastically deformed if they rest against a surface of the recess. A bridging of the sealing segments of the first sealing group takes place, wherein they may adopt an angle greater than/equal to 90°. At the same time, the sealing segments of the second sealing segment group move out of contact with the recess edge and slip into the recess. In the final step, the stamp used for assembly is removed and the sealing element, in particular the sealing segments, adopt their predetermined position in the recess. The sealing element is centered and the sealing segments are radially and axially positioned.

BRIEF DESCRIPTION OF THE DRAWINGS

Further advantages and details are illustrated by the following description of preferred embodiments, with reference to the attached drawings. In the drawings.

DETAILED DESCRIPTION

Figure 1:
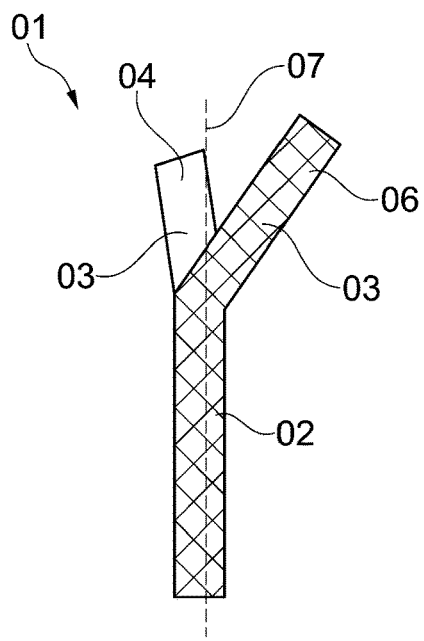
FIG. 1 shows a partial sectional view of a first embodiment of a sealing element.

FIG. 1 shows a partial sectional view of a first embodiment of a sealing element 01. The sealing element 01, which is used to seal a space, comprises a disk-shaped sealing disk 02 on which multiple sealing segments 03 are arranged. The sealing disk 02 and the sealing segments 03 are produced as one piece. The sealing segments 03 are divided into two sealing segment groups, namely into a first sealing segment group 04 and a second sealing segment group 06. The sealing element 01 has a main extension plane 07. The sealing segments of the first sealing segment group 04 are angled in a negative direction (relative to the clockwise direction) starting from the main extension plane 07. In other words, the main extension plane 07 and the sealing segments of the first sealing segment group 04 are spanned by a negative angle. The sealing segments of the second sealing segment group 06 are angled in a positive direction (relative to the clockwise direction) starting from the main extension plane 07. In other words, the main extension plane 07 and the sealing segments of the second sealing segment group 04 are spanned by a positive angle. The sealing segments 03 are made of an elastic material.

Figure 2:
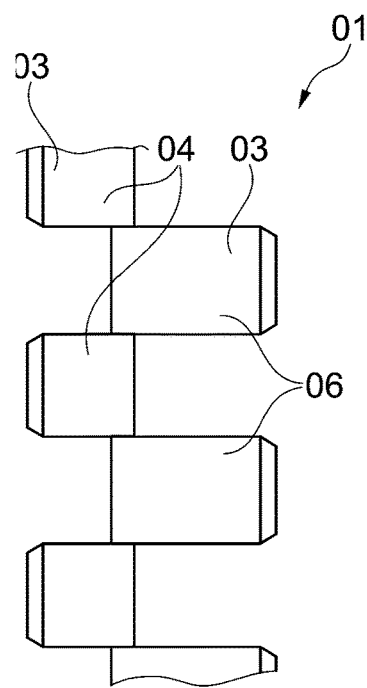
FIG. 2 shows a detail plan view of the circumference side of the sealing element according to FIG. 1.

FIG. 2 shows a detailed plan view of the front side of the sealing element 01 according to FIG. 1. The individual sealing segments 03 of the first and second sealing segment groups 04, 06 can be seen in the plan view according to FIG. 2. The sealing segments of the first and second sealing segment groups 04, 06 are arranged in an alternatingly circumferential manner on the sealing disk 02, wherein the side surfaces of adjacent sealing segments 03 abut one another at least partially.

Figure 3:
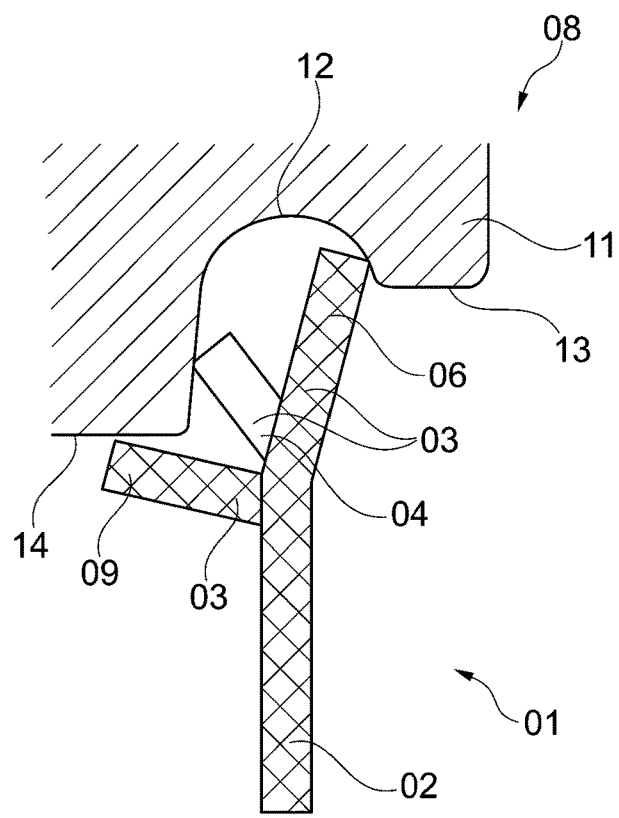
FIG. 3 shows a partial sectional view of a bearing arrangement with a second embodiment of the sealing element.

FIG. 3 shows a partial sectional view of a bearing arrangement 08 with a second embodiment of the sealing element 01 which is mounted. In addition to the sealing segments of the first and second sealing segment groups 04, 06, a sealing segment of a further third sealing segment group 09 is arranged on the sealing disk 02. The sealing segment of the third sealing segment group 09 is configured circumferentially on the sealing disk 02. The main extension plane 07 of the sealing element 01 and the sealing segment of the third sealing segment group 09 is spanned by a negative angle which is greater than the span angle between the sealing segments of the first sealing segment group 04 and the main extension plane 07.

The "fanned out" arrangement of the sealing segments 03 is evident in FIG. 3, making simple and accurate positioning of the sealing element 01 possible. The sealing element 01 sits on an outer bearing ring 11. The outer bearing ring 11 has a circumferential recess 12. On the outer edge of the outer bearing ring 11 is formed a recess edge 13 with a given diameter. The diameter of the recess edge 13 is greater than an inner ring diameter 14 of the outer bearing ring 11, but smaller than an outer ring diameter of the outer bearing ring 11. The sealing segments of the first and second sealing segment group 04, 06 rest at least partially against the recess 12 in the outer bearing ring 11. The sealing segment of the further sealing segment group 09 rests in a sealing manner against the inner ring diameter 14 of the outer bearing ring 11. The diameter of the sealing disk 02 with the sealing segment of the first sealing segment group 04 is smaller than the diameter of the sealing disk with the sealing segment of the second sealing segment group 06. In other words, the sealing segments of the first sealing segment group 04 are shorter than the sealing segments of the second sealing segment group 06.

Figure 4:
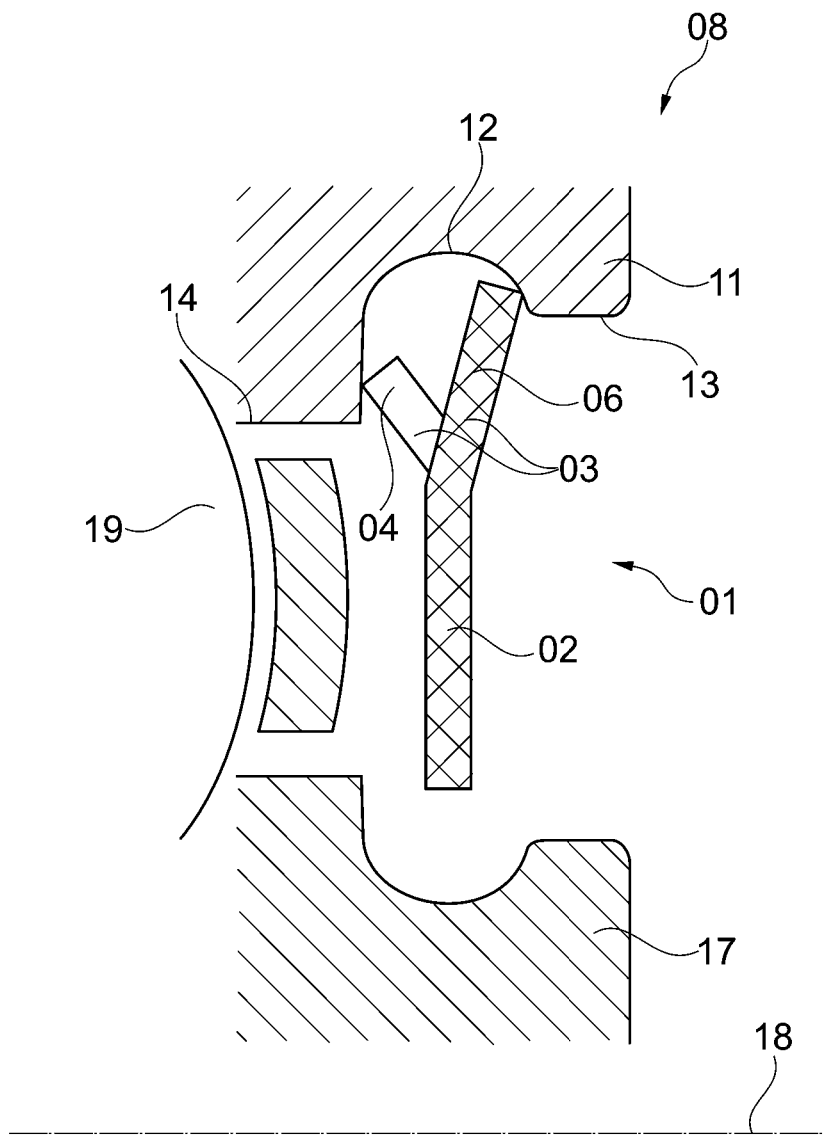
FIG. 4 shows a cross-sectional view of a bearing arrangement with the sealing element.

FIG. 4 shows a cross-sectional view of the bearing arrangement 08 with the sealing element 01, wherein the sealing element resembles the sealing element 01 shown in FIG. 1. The sealing element 01 comprises the sealing disk 02 and sealing segments of the first and second sealing segment group 04, 06. The bearing arrangement 08 furthermore comprises the outer bearing ring 11 and an inner bearing ring 17 which have a common axis of rotation 18. The bearing rings 11, 17 are rotatable in respect of one another. Rolling bodies 19 are arranged between the bearing rings 11, 17. The outer bearing ring 11 has a circumferential recess 12. The sealing element 01 rests with the sealing segments of the first and second sealing segment group 04, 06 in the recess 12. The sealing element 01 is therefore shown in the installed state. The recess 12 is open in the radial direction towards the inner bearing ring 17. Accurate axial and radial positioning of the sealing element 01 is guaranteed by means of the sealing segments of the first and second sealing segment group 04, 06.

LIST OF REFERENCE NUMBERS

01 Sealing element
02 Sealing disk
03 Sealing segments
04 First sealing segment group
05 -
06 Second sealing segment group
07 Main extension plane
08 Bearing arrangement
09 Third sealing segment group
10 -
11 Outer bearing ring
12 Recess
13 Recess edge
14 Inner ring diameter of the outer bearing ring 11
15 -
16 -
17 Inner bearing ring
18 Axis of rotation
19 Rolling body

The invention claimed is:

1. A sealing element for sealing a space between a first bearing ring and a second bearing ring which have a common axis of rotation, the sealing element comprising: a sealing disk which has a plurality of sealing segments on at least one circumference, wherein the sealing segments belong alternately to a first sealing segment group, a second sealing segment group, and a third sealing group, wherein the sealing segments of the first sealing segment group exhibit a negative angle, the sealing segments of the second sealing segment group exhibit a first positive angle, and the third sealing group exhibit a second positive angle different than the first positive angle in relation to the main extension plane.

2. The sealing element of claim 1, wherein the sealing segments of the first sealing segment group are shorter than the sealing segments of the second sealing segment group.

3. The sealing element of claim 1, wherein the sealing segments are arranged on the radially outer circumference of the sealing disk.

4. The sealing element of claim 1, wherein the sealing disc and the sealing segments are configured together in one piece.

5. A bearing arrangement comprising: a first bearing ring; a second bearing ring which can be rotated about a common axis with respect to the first bearing ring; rolling bodies arranged between the bearing rings; and a sealing element according to claim 1, wherein at least one of the bearing rings has a circumferential recess in which the sealing segments of the first and second sealing segment group come to rest.

6. The bearing arrangement of claim 5, wherein the sealing segments of the second sealing segment group extend radially beyond a recess edge into the recess.

7. The bearing arrangement of claim 6, wherein the recess edge is configured on an outer edge of the bearing ring.

8. The bearing arrangement of claim 5, wherein the sealing segments of the first sealing segment group are angled axially in the direction of the rolling bodies.

9. A bearing arrangement comprising:
a first bearing ring having a circumferential recess;
a second bearing ring;
a plurality of rolling bodies arranged between the bearing rings; and
a sealing element having
a disk,
a first group of sealing segments extending from a periphery of the disk into the recess, wherein the sealing segments of the first group are angled toward the rolling bodies,
a second group of sealing segments extending from the periphery of the disk into the recess, wherein the sealing segments of the second group are angled away from the rolling bodies, and a third group of sealing segments extending from the periphery of the disk, contacting first the first bearing ring outside of the recess, and angled toward the rolling bodies.

10. The bearing arrangement of claim 9 wherein the sealing segments of the first sealing segment group are shorter than the sealing segments of the second sealing segment group.

11. The bearing arrangement of claim 9 wherein:
the first ring is an outer ring;
the second ring is an inner ring; and
the sealing segments are arranged on the radially outer periphery of the sealing disk.

* * * * *